US012633865B2

(12) United States Patent
El Baraka et al.

(10) Patent No.: US 12,633,865 B2
(45) Date of Patent: May 19, 2026

(54) HEATING CIRCUIT FOR A MOTOR VEHICLE COMPRISING AN ELECTRICAL TRACTION MACHINE

(71) Applicant: VALEO EQUIPEMENTS ELECTRIQUES MOTEUR, Creteil Cedex (FR)

(72) Inventors: Khadija El Baraka, Creteil Cedex (FR); Svetislav Jugovic, Creteil Cedex (FR)

(73) Assignee: VALEO EQUIPEMENTS ELECTRIQUES MOTEUR, Creteil Cedex (FR)

( * ) Notice: Subject to any disclaimer, the term of this patent is extended or adjusted under 35 U.S.C. 154(b) by 195 days.

(21) Appl. No.: 18/539,961

(22) Filed: Dec. 14, 2023

(65) Prior Publication Data

US 2024/0204711 A1      Jun. 20, 2024

(30) Foreign Application Priority Data

Dec. 16, 2022      (FR) ...................................... 22 13563

(51) Int. Cl.
*G05B 5/00*            (2006.01)
*B60H 1/14*            (2006.01)
(Continued)

(52) U.S. Cl.
CPC ............. *H02P 29/62* (2016.02); *B60H 1/143* (2013.01); *B60K 1/00* (2013.01); *B60L 15/007* (2013.01);
(Continued)

(58) Field of Classification Search
CPC .......... H02P 29/62; H02P 27/06; H02P 25/22; H02P 29/60
See application file for complete search history.

(56) References Cited

U.S. PATENT DOCUMENTS

2013/0152892 A1      6/2013   Hawkins et al.
2016/0164378 A1      6/2016   Gauthier et al.
(Continued)

FOREIGN PATENT DOCUMENTS

DE      10 2019 117 893 A1      1/2021
EP      3 088 230 A1      11/2016
WO      WO-2020177963 A1 *    9/2020      ................ F01P 5/10

OTHER PUBLICATIONS

Preliminary French Search Report issued Jul. 17, 2023 in French Application 22 13563 filed on Dec. 16, 2022, 9 pages (with English Translation of Categories of Cited documents & Written Opinion).

*Primary Examiner* — Karen Masih
(74) *Attorney, Agent, or Firm* — Oblon, McClelland, Maier & Neustadt, L.L.P.

(57) ABSTRACT

Method for heating a coolant of an electrical traction machine of a motor vehicle, the electrical machine including, in addition to the coolant, a stator including a polyphase winding, the stator being in heat exchange with the coolant, a rotor, and an inverter/rectifier supplying power to the polyphase winding. The inverter/rectifier includes a plurality of switching cells controlled by a control device. The control device of the inverter/rectifier is configured to control the switching cells so as to short-circuit the polyphase winding in predetermined conditions for the purpose of heating the coolant.

18 Claims, 4 Drawing Sheets

(51) Int. Cl.

| | |
|---|---|
| B60K 1/00 | (2006.01) |
| B60L 15/00 | (2006.01) |
| F16H 57/04 | (2010.01) |
| H02P 29/62 | (2016.01) |

(52) U.S. Cl.
    CPC ..... *F16H 57/0413* (2013.01); *F16H 57/0476* (2013.01); *B60K 2001/006* (2013.01)

(56) References Cited

U.S. PATENT DOCUMENTS

| | | |
|---|---|---|
| 2021/0001714 A1 | 1/2021 | Oechslen |
| 2022/0305921 A1 | 9/2022 | Mueller et al. |

* cited by examiner

[Fig 1]
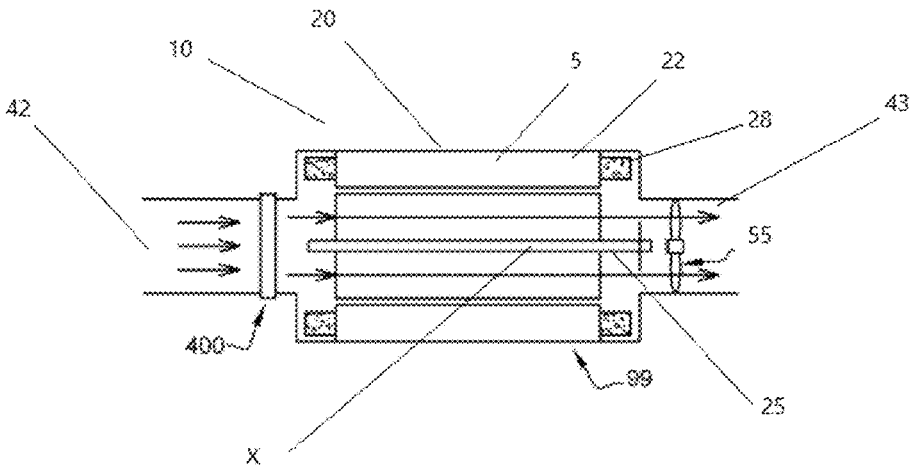
[Fig 2]

[Fig 3]
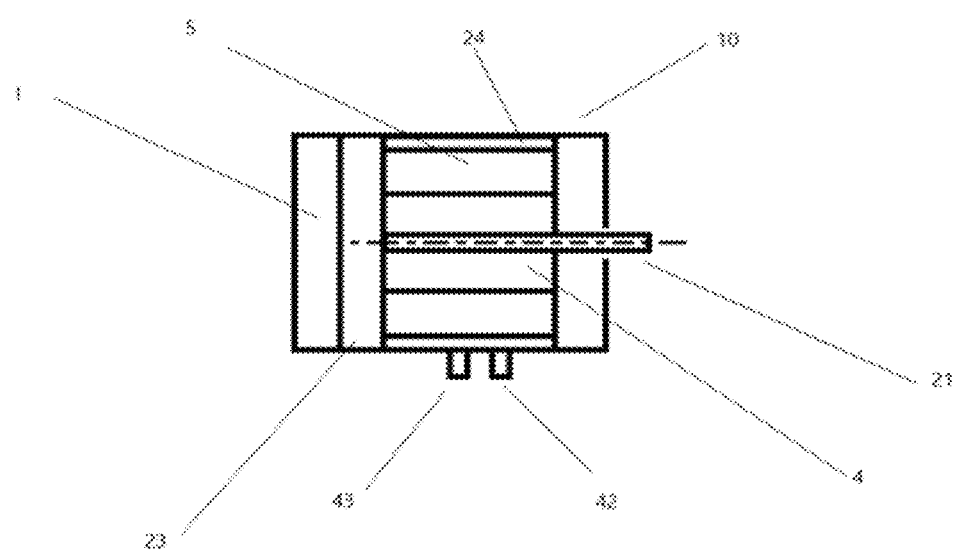
[Fig 4]
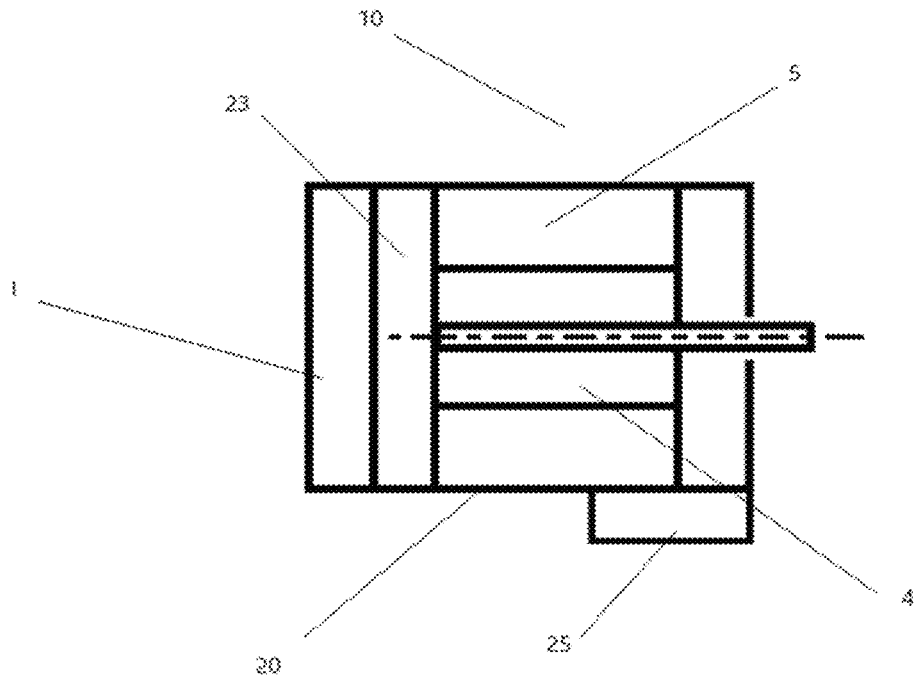

[Fig 5]
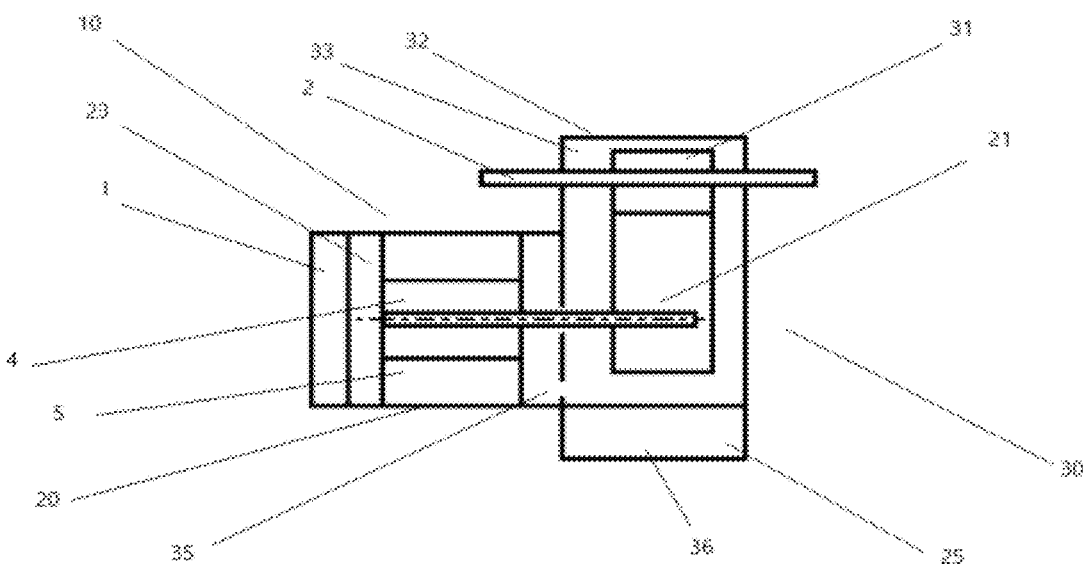
[Fig 6]
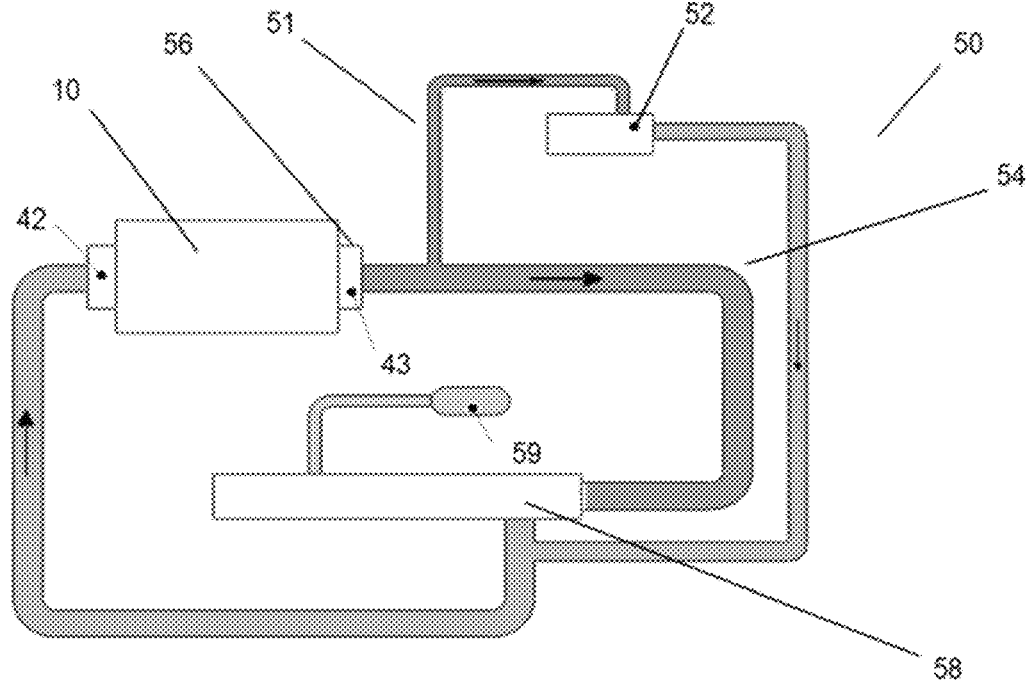

[Fig. 7]
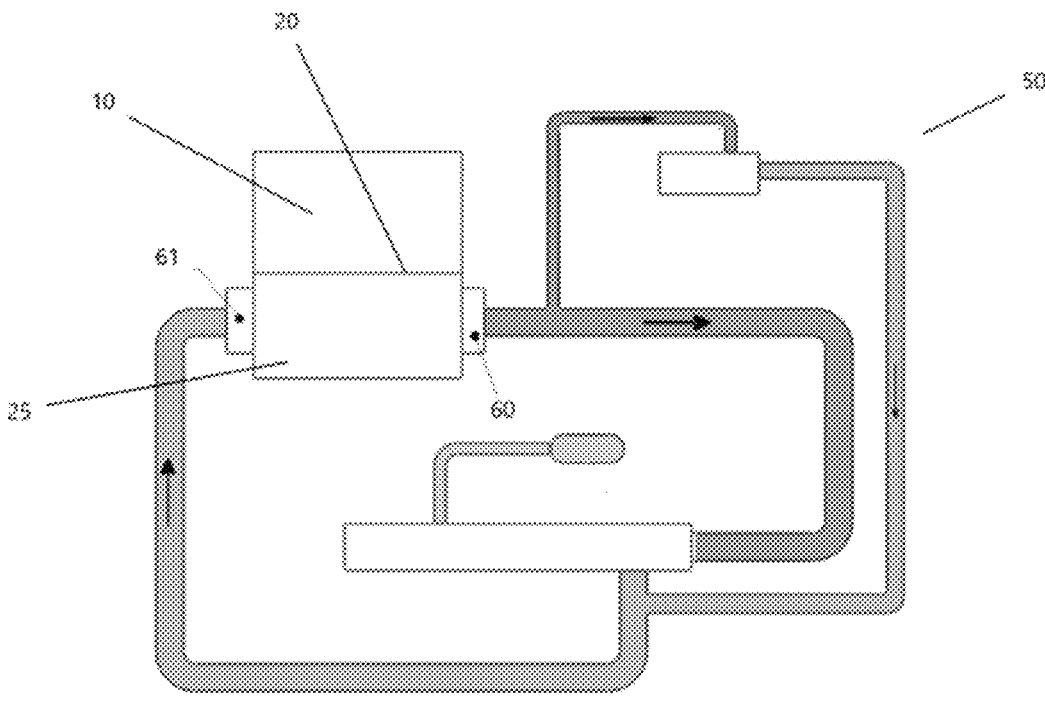
[Fig. 8]

HEATING CIRCUIT FOR A MOTOR VEHICLE COMPRISING AN ELECTRICAL TRACTION MACHINE

TECHNICAL FIELD OF THE INVENTION

The present invention relates to a heating circuit for a motor vehicle comprising an electrical traction machine, and to the method for heating the coolant of the electrical machine.

TECHNOLOGICAL BACKGROUND

The invention may be applied, for example, if the vehicle is a hybrid or electric vehicle. Such an electrical machine comprises, in a known way:

a coolant, a stator comprising a polyphase winding, the stator being in contact with the coolant, a rotor, and an inverter/rectifier supplying the polyphase winding, the inverter/rectifier comprising a plurality of switching cells controlled by a control device.

This electrical machine forms part of a hybrid or electric traction assembly. The electrical machine is, for example, supplied with a nominal voltage of 48 V, or more than 100 V, or even more than 300 V.

20) In the case of an electrical machine sharing a common cooling circuit with a speed reducer, for example a gearbox, with which it is associated, it is known that the coolant degrades the traction performance, notably on starting, when the coolant is too cold.

The low temperature of the coolant also has a negative effect if the electrical traction machine contributes to the heating the vehicle interior.

There is a need to provide for the heating of the coolant of an electrical traction machine, notably on the starting of the vehicle or when the ambient temperature is low.

The object of the invention is to meet this need, and it achieves this, according to one of its aspects, by means of a method of heating a coolant of an electrical traction machine of a motor vehicle, the electrical machine comprising, in addition to the coolant:

a stator comprising a polyphase winding, the stator being in heat exchange with the coolant, a rotor, and an inverter/rectifier supplying the polyphase winding, the inverter/rectifier comprising a plurality of switching cells controlled by a control device.

The heating method is characterized in that the control device of the inverter/rectifier is configured to control the switching cells in such a way that the polyphase winding is short-circuited in predetermined conditions for the purpose of heating the coolant.

This low-cost heating method may be used to heat the coolant rapidly without any additional external heater.

The coolant is heated by ohmic loss from the stator and by iron loss from the stator when the polyphase winding is short-circuited.

The control device is, for example, incorporated in the vehicle's transmission control unit (TCU) or in the engine control unit (ECU) or in another separate control unit. For example, the control device uses one or more digital processing devices such as microcontrollers. The control device is, for example, an application-specific integrated circuit (ASIC).

The controllable switching cells of the inverter/rectifier device may not be entirely controlled by the control device. Other controllers may be used to act on the inverter/rectifier. According to an aspect of the invention, some or all of the polyphase winding may be short-circuited.

The electrical machine is a traction machine if it is connected to the power train of the vehicle.

According to an aspect of the invention, the coolant is water. As a variant, the coolant is oil. In a further variant, the coolant is air.

According to an aspect of the invention, the electrical machine comprises a first enclosure, notably a sealed enclosure, in which the coolant flows and in which the stator is placed. The stator may be immersed in the coolant. The polyphase winding may be directly in contact with the coolant.

According to an aspect of the invention, the electrical machine may comprise a cooling chamber in which only the coolant is placed. The cooling chamber may be placed around the stator. The radial direction is taken to be relative to an axis of rotation of the rotor.

According to an aspect of the invention, the coolant also flows in a heating circuit of the motor vehicle.

The heating circuit may be a heating circuit for the interior of the motor vehicle.

The coolant may be used to cool the electrical machine and to heat the interior of the motor vehicle simultaneously.

The shared use of the coolant of the electrical machine enables the interior to be heated without an air conditioning compressor or a heat pump. The heating method is economical, requiring no additional external heater.

If the interior is heated by the coolant of the electrical machine, a certain amount of driving time is required to raise the temperature of the coolant and thus provide warm air in the interior. In very cold weather, the time required may be significant, and this may decrease the comfort of the motor vehicle's occupants. The short-circuited polyphase winding allows the temperature of the coolant to be raised rapidly, thus providing warm air in the interior.

According to an aspect of the invention, the coolant flowing in the heating circuit is preferably water or air.

According to an aspect of the invention, the control device of the inverter/rectifier is configured to control the switching cells so as to short-circuit the polyphase winding when the vehicle is parked, notably by remote programming.

According to an aspect of the invention, the coolant also flows in a speed reducer, for example a gearbox, of the motor vehicle.

The coolant may be used to cool the electrical machine and the speed reducer simultaneously.

According to an aspect of the invention, the coolant flowing in the speed reducer is preferably oil. The coolant may then be used to lubricate the components of the speed reducer.

Heating the coolant, notably oil, can reduce the friction in the electrical machine and in the associated speed reducer. Heating the oil can also limit the temperature variation in inner and outer bearing rings of the electrical machine and/or the speed reducer. The service life of the components is prolonged. Abnormal noises at lower ambient temperatures, where the viscosity of the oil is greater, are avoided.

According to an aspect of the invention, the speed reducer may comprise a second enclosure. The second enclosure may form a common space with the enclosure in which the electrical machine is placed. The coolant flows in this common space with the components of the speed reducer and the stator. The components of the speed reducer and the stator are immersed in the coolant.

As a variant, the coolant flows in the heating circuit, while the speed reducer is cooled independently of the coolant. In this configuration, the speed reducer may have a dedicated cooling system in which there flows a second coolant, the nature of which may be identical to or different from that of the coolant of the electrical machine. For example, the coolant of the electrical machine may be water and the second coolant may be oil.

According to an aspect of the invention, the rotor may be cooled by a rotor cooling system, independent of the stator cooling system.

According to an aspect of the invention, the inverter/rectifier is cooled by an inverter/rectifier cooling system, independent of the stator cooling system.

According to an aspect of the invention, the polyphase winding is short-circuited when the coolant is below a threshold temperature. For example, 40 degrees, or 60 degrees, or 80 degrees, notably when the coolant is oil.

According to an aspect of the invention, the polyphase winding is short-circuited when the coolant is oil and its coefficient of viscosity is greater than a given threshold value, for example greater than $1000 \text{ mm}^2/\text{s}$.

According to an aspect of the invention, the temperature of the coolant is found by using at least one temperature sensor. The temperature sensor may be one or more, NTC or PTC, temperature probes. As a variant, or in addition, it may consist of one or more thermocouples.

The invention also relates to a heating system for a motor vehicle comprising an electrical traction machine, the electrical machine comprising:
- a coolant,
- a stator comprising a polyphase winding, the stator exchanging heat with the coolant,
- a rotor,
- an inverter/rectifier supplying power to the polyphase winding, the inverter/rectifier comprising a plurality of switching cells controlled by a control device.

The heating system also comprises a motor vehicle interior heating circuit and/or a motor vehicle battery. The heating circuit is external to the electrical machine.

The control device of the inverter/rectifier is configured to control the switching cells so as to short-circuit the polyphase winding in predetermined conditions, for the purpose of heating the coolant.

According to an aspect of the invention, the coolant of the electrical machine also flows in the heating circuit. In this vehicle heating system, the stator coolant is shared and may be used to heat the interior. In this heating system, the coolant is preferably air or water.

As a variant, the coolant of the electrical machine does not flow in the heating circuit. The coolant exchanges heat with the heating circuit, notably by means of a heat exchanger which is, for example, fixed to the first or the second enclosure. In this heating system, the coolant is preferably oil or water.

The whole of the above description relating to the components of the heating system is applicable to said heating system.

According to an aspect of the invention, the heating system comprises an external cooling circuit, in addition to the heating circuit. The heating circuit may be branched from the external cooling circuit.

The external cooling circuit may be used to cool the coolant outside the electrical machine without heating the vehicle interior.

According to an aspect of the invention, the external cooling circuit comprises a cooling radiator. The cooling radiator enables thermal energy to be transferred from the coolant. The cooling radiator may interact with an expansion chamber.

According to an aspect of the invention, the heating circuit comprises a heating radiator. The heating radiator enables thermal energy to be transferred from the coolant toward the vehicle interior.

According to an aspect of the invention, the heating circuit has a fluid inlet and a fluid outlet for the coolant. The fluid inlet and the fluid outlet may be shared between the heating circuit and the cooling circuit.

If the coolant of the electrical machine also flows in the heating circuit, the fluid inlet of the heating circuit is a fluid outlet of the electrical machine, and the fluid outlet of the heating circuit is a fluid inlet of the electrical machine.

If the coolant of the electrical machine is in heat exchange with the heating circuit via the heat exchanger, the fluid inlet of the heating circuit is a fluid outlet of the heat exchanger, and the fluid outlet of the heating circuit is a fluid inlet of the heat exchanger.

According to an aspect of the invention, the heating radiator and/or the cooling radiator are positioned between the fluid inlet and the fluid outlet in the direction of the coolant flow. According to an aspect of the invention, the heating system comprises a device for moving the coolant, a pump for example, or a fan for example. The device for moving the coolant may be placed at the fluid inlet and/or at the fluid outlet of the electrical machine.

According to an aspect of the invention, the heating system comprises a valve placed between the electrical machine and the heating circuit. The valve may be placed between the electrical machine, on the one hand, and the heating circuit and the external cooling circuit, on the other hand.

The valve prevents the coolant from flowing between the electrical machine and the heating circuit in certain predetermined conditions. The valve may be electrically controlled. The valve may be self-powered. The valve may be placed at the fluid outlet of the electrical machine.

According to an aspect of the invention, each controllable switching cell may comprise a field effect transistor. It may be a MOS transistor, for example. This transistor may be made of silicon.

According to an aspect of the invention, the electrical machine is, for example, a synchronous machine, for example a three-phase synchronous machine or a synchronous machine whose stator winding forms a double three-phase system. The stator winding is, for example, formed by wires, or by conductive bars that are connected to one another.

According to an aspect of the invention, the rotor may be a claw-pole rotor. This rotor then comprises first and second interleaved pole wheels, the first pole wheel defining a series of claws with an overall trapezoidal shape, each claw extending axially toward the second pole wheel, the second pole wheel defining a series of claws with an overall trapezoidal shape, each claw extending axially toward the first pole wheel. For the rotor, a permanent magnet may be accommodated between two circumferentially consecutive claws.

As a variant, the rotor may be a rotor other than a claw-pole rotor, for example a rotor comprising a stack of laminations or a squirrel-cage rotor.

According to an aspect of the invention, the rotor may comprise any number of pole pairs, for example three, four, six or eight pole pairs.

According to an aspect of the invention, the electrical machine may have a nominal power rating of 4 KW, 8 KW, 15 KW, 25 KW or more.

The electrical machine is not necessarily a synchronous machine; it may be an asynchronous machine.

The invention also relates to a motor vehicle, notably of the hybrid traction type, or notably of the purely electric type, comprising the heating system as described above.

For the purposes of the present application, a "vehicle" denotes any kind of mobility using electric or hybrid traction. Thus "vehicle" includes a machine travelling on the ground with four, three, two or any other number of wheels, or a machine moving in the air or on water, or even in space. An example of a vehicle is a motor vehicle.

According to an aspect of the invention, the vehicle comprises two subnetworks between which is interposed a switching system forming a DC/DC voltage converter. The DC/DC converter may use controllable electronic switches such as gallium nitride (GaN), silicon carbide (SiC), or silicon transistors. The first electrical subnetwork is, for example, that which is connected to the inverter/rectifier, and the second subnetwork has a nominal voltage of 12 V, for example.

According to an aspect of the invention, the vehicle may comprise a battery. The electrical machine may be connected to the battery by the inverter/rectifier. The battery may have a nominal voltage of less than 60 V, being equal to 48 V or 52 V, for example. As a variant, the battery may have a nominal voltage of more than 200 V, or more than 300 V for example.

In the case of a hybrid traction vehicle, the vehicle comprises a heat engine. The electrical machine may comprise a pulley or any other means of connection to a heat engine of the vehicle. For example, the electrical machine is connected, notably via a belt, to a crankshaft of the vehicle's heat engine. As a variant, the electrical machine is connected to other locations in the vehicle, for example to the input of a gearbox from the point of view of the torque travelling toward the vehicle wheels, to the output of the gearbox from the point of view of the torque travelling toward the vehicle wheels, or to the gearbox itself from the point of view of the torque travelling toward the vehicle wheels.

The invention will possibly be better understood on reading the following description of one non-limiting example of implementation thereof, and on examining the appended drawings, in which:

FIG. 1 shows a schematic view of an example of a motor vehicle according to the present invention, FIG. 2 shows schematically, in axial section, an example of an electrical machine in which the coolant of the machine is air, and to which the method according to the invention can be applied, FIG. 3 shows schematically, in axial section, an example of an electrical machine in which the coolant of the machine is water, and to which the method according to the invention can be applied, FIG. 4 shows schematically, in axial section, an example of an electrical machine in which the coolant of the machine is oil, and to which the method according to the invention can be applied, FIG. 5 shows schematically, in axial section, an example of an electrical machine associated with a speed reducer, in which the coolant of the machine is oil, and to which the method according to the invention can be applied, FIG. 6 shows schematically an example of a heating system according to the invention in which the coolant of the machine flows in a heating circuit for heating the vehicle interior, FIG. 7 shows schematically an example of a heating system according to the invention in which the coolant of the machine is in heat exchange with the vehicle interior heating circuit, and FIG. 8 shows a method according to the invention.

In the example considered, the vehicle is a vehicle with purely electric traction (EV) or a hybrid vehicle, comprising wheels 3 and the electrical machine 10. The electrical machine is configured to drive, at least indirectly, at least one of the wheels 3.

In the example considered, the electrical machine 10 can move only the vehicle EV, and is installed on a rear axle 2 between a rear wheel 3, on the one hand, and a speed reducer on the other hand. Here, the speed reducer comprises a differential 31. The speed reducer may, for example, be a gearbox.

As a variant, the electrical machine 10 may be installed on the front axle (not shown). As a further variant, the electrical machine 10 may be installed in at least one wheel 3. Notably, one electrical machine 10 is used in each rear wheel 3.

As a variant which is not shown, in the case of a hybrid traction vehicle, the vehicle comprises a heat engine to which the electrical machine 10 is connected. The electrical machine is, for example, connected to a crankshaft of the heat engine via a belt.

In the example described, the electrical machine 10 comprises a rotor 4 that can rotate about an axis of rotation of the rotor, and a stator 5. The stator comprises a polyphase winding 28. The stator 5 is in heat exchange with the coolant. Different alternative coolants and electrical machines will be described with reference to the following figures.

The polyphase winding, and possibly the rotor, depending on its nature, are powered via an electronic power component 9 comprising an inverter/rectifier I. The inverter/rectifier I comprises a plurality of switching cells. Each switching cell comprises, for example, a field effect transistor. It may be a MOS transistor, for example. This transistor may be made of silicon.

In the example considered, the plurality of switching cells is controlled by a control device. The control device is, for example, incorporated in the vehicle's transmission control unit (TCU) or in the engine control unit (ECU) or in another separate control unit. For example, the control device uses one or more digital processing devices such as microcontrollers. The control device is, for example, an integrated circuit of the ASIC (Application-Specific Integrated Circuit) type.

In the example considered, the vehicle EV comprises two subnetworks between which is interposed a switching system defining a DC/DC voltage converter 7. The DC/DC voltage converter 7 comprises, for example, transistors that may be of the same type as those mentioned above. The first electrical subnetwork 6 is connected to the inverter/rectifier I, and the second electrical subnetwork 8 has, for example, a nominal voltage of 12 V.

In the example considered, the vehicle EV comprises a power supply battery, which in this case is of a high-voltage type and preferably rechargeable, for delivering power to the electrical machine 10. The battery may have a nominal voltage of more than 200 V, for example more than 300 V. The battery B may have a nominal voltage that is less than 60 V, being equal to 48 V or 52 V for example. The power supply battery forms part of the first electrical network. The polyphase winding of the stator forms part of the first electrical network 6. The first electrical subnetwork 6 may or may not also comprise one or more switches.

In the example considered, the second subnetwork 8 has, for example, a nominal voltage of 12 V. This second electrical subnetwork 8 may comprise a battery 40 as well as switches (not shown), and may be chosen from the following list which is not exhaustive: a lighting system, an electrically assisted steering system, a braking system, an air conditioning system, and a car radio system.

An example of an electrical machine 10 is described with reference to FIG. 2. In this case, the electrical machine 10 comprises a casing 20 carrying inside it the stator 5 surrounding the rotor 4 which is fixed to a rotor shaft 21. This rotor shaft 21 passes through the centre of the rotor 4. The body 22 and the rotor 1 are of annular shape around an axis X of rotation of the rotor shaft 21 and of the rotor 4.

In the example considered, the electrical machine comprises a first enclosure 23, formed by the casing 20, in which flows the coolant, which in this case is air. The stator 5 is placed in this enclosure 23. The stator 5 is in direct contact with the air.

In the example considered, the stator 5 comprises a body 22 carrying the polyphase winding 28. The polyphase winding 28 passes through the body and extends in axial projection from either side of this body 30.

In the example considered, there is a gap between the outer periphery of the annular rotor 4 and the inner periphery of the body 30 of the stator 3.

In the example considered, the polyphase winding 28 is composed of a plurality of phases, each comprising at least one winding. The outputs of these windings are electrically connected to the inverter/rectifier I, not shown in FIG. 2.

In the example considered, the electrical machine 10 has a fluid inlet 42 and a fluid outlet 43 for the coolant, to enable the coolant to enter and leave the enclosure 23.

Another example of an electrical machine 10 is described with reference to FIG. 3. This electrical machine 10 differs from that of FIG. 2 in that the coolant is a cooling liquid, particularly water.

In the example considered, the electrical machine comprises a cooling chamber 24 positioned radially around the stator 5. The fluid inlet 42 and the fluid outlet 43 are in fluid connection with the cooling chamber 24.

Another example of an electrical machine 10 is described with reference to FIG. 4. This electrical machine 10 differs from that of FIG. 3 in that the coolant is oil. The oil and the stator 5 are positioned in the enclosure 23. The oil is in direct contact with the stator 5, and notably with the polyphase winding 28.

In the example considered, the electrical machine 10 comprises neither a fluid inlet nor a fluid outlet. A heat exchanger 25 is provided in the electrical machine to remove heat from the oil due to the heat of the stator and/or the rotor. The heat exchanger 25 is fixed to the casing 20.

Another example of an electrical machine 10 is described with reference to FIG. 5. The electrical machine 10 is associated with the speed reducer 30.

In the example considered, the speed reducer comprises an enclosure 33 formed by a speed reducer casing 32. The differential 31 is housed in the second enclosure and is in engagement with the rear axle 2, for example. The rear axle 2 may pass through the speed reducer 32. The rotor shaft 21 extends in the first enclosure 23 and in the second enclosure 33.

The rotor shaft 21 is in engagement with components of the speed reducer, in this case gear wheels (not shown) of the speed reducer 30.

In the example considered, the second enclosure 33 forms a common space with the first enclosure 23 in which the electrical machine 10 is positioned, and the coolant, which in this case is oil, flows in this common space with the components of the speed reducer 30 and the stator 5. The oil may be used to cool the electrical machine 10 and the speed reducer 30 simultaneously.

In the example considered, one or more passages 35 are provided between the first enclosure 23 and the second enclosure 33.

In the example considered, the heat exchanger 25 is fixed to the speed reducer casing and a speed reducer pump 35 is provided to spray the oil onto the components of the speed reducer and/or onto the stator 5 and/or onto the rotor 4 and/or onto the inverter/rectifier I.

In the example considered in FIG. 5, the control device (not shown) of the inverter/rectifier I is configured to implement a method A of heating the oil, as shown in FIG. 8. The control device is configured to control the switching cells so as to short-circuit the polyphase winding 28 in predetermined conditions, for the purpose of heating the coolant, in this case the oil.

In the example considered, the oil is heated by ohmic loss from the stator 5 and by iron loss from the stator 5 when the polyphase winding is short-circuited.

In the example considered, some or all of the polyphase winding 28 may be short-circuited.

In the example considered, the oil flowing in the first enclosure 23 and in the second enclosure 33 can then lubricate the components of the speed reducer. Heating the oil can reduce the friction in the electrical machine and in the associated speed reducer. Heating the oil can also limit the temperature variation in inner and outer bearing rings of the electrical machine and/or the speed reducer. The service life of the components is prolonged. Abnormal noises at lower ambient temperatures, where the viscosity of the oil is greater, are avoided.

In the example considered, the polyphase winding 28 is short-circuited when the oil is above a threshold temperature, of 40 degrees, 60 degrees, or 80 degrees, for example, or when the coefficient of viscosity is above a given threshold value.

FIG. 6 shows a heating system 50 for a motor vehicle comprising an electrical machine whose coolant is water or air. For example, the machine is that of FIGS. 2 and 3. The cooling system 50 also comprises a heating circuit 51 for a motor vehicle interior.

In the example considered, the coolant of the electrical machine 10 also flows in the heating circuit 51. The coolant, in this case air or water, is shared and enables the vehicle interior to be heated.

The shared use of the coolant of the electrical machine enables the interior to be heated 30) without an air conditioning compressor or a heat pump. The heating method is economical, requiring no additional external heater.

In the example considered, the short-circuiting of the polyphase winding of the electrical machine 10 may enable the interior to be heated, particularly when the vehicle is parked, notably by remote programming.

If the interior is heated by the coolant of the electrical machine, a certain amount of driving time is required to raise the temperature of the coolant and thus provide warm air in the interior. In very cold weather, the time required may be significant, and this may decrease the comfort of the motor vehicle's occupants. The short-circuited polyphase winding allows the temperature of the coolant to be raised rapidly, thus providing warm air in the interior.

In the example considered, the heating circuit 51 comprises a heating radiator 52. The heating radiator 52 enables thermal energy to be transferred from the coolant toward the vehicle interior. The heating radiator 52 is external and remote from the electrical machine 10.

In the example considered, the heating system 50 comprises, in addition to the heating circuit 51, an external cooling circuit 54. The heating circuit 52 may be branched from the external cooling circuit 54. The external cooling circuit 54 enables the coolant to be cooled outside the electrical machine 10 without heating the vehicle interior.

In the example considered, the heating circuit 51 has a fluid inlet and a fluid outlet for the coolant. The fluid inlet of the heating circuit 51 is the fluid outlet of the electrical machine 43, and the fluid outlet of the heating circuit is the fluid inlet of the electrical machine 42. The fluid inlet 42 of the electrical machine 10 receives the coolant from the heating circuit 51 and/or from the external cooling circuit 54.

In the example considered, the heating system 50 comprises a device for moving the coolant in the heating and cooling circuits.

The moving device may be a pump, notably located at the fluid inlet 42 of the electrical 20) machine 10 when the coolant is water.

The moving device may be a fan 55, notably located at the fluid outlet 43 of the electrical machine 10 when the coolant is air. This fan 55 is shown in FIG. 2.

In the example considered, the heating system 50 comprises a valve 56 placed between the electrical machine 10 and the heating circuit 51. The valve 56 prevents the coolant from flowing between the electrical machine and the heating circuit in certain predetermined conditions.

In the example considered, the external cooling circuit 54 comprises a cooling radiator 58. The cooling radiator enables thermal energy to be transferred from the coolant. Here, the cooling radiator interacts with an expansion chamber 59.

FIG. 7 also shows a heating system 50. The heating system differs from that shown in FIG. 6 in that the coolant of the electrical machine 10 does not flow in the heating circuit 51.

In the example considered, the coolant, preferably oil in this case, is in heat exchange with the heating circuit 51, in this case via the heat exchanger 25 which is, for example, fixed to the casing 20 of the electrical machine 10.

In the example considered, the fluid inlet of the heating circuit 51 is a fluid outlet 60 of the heat exchanger 25, and the fluid outlet of the heating circuit 51 is a fluid inlet 61 of the heat exchanger 25.

The heating systems 50 of FIGS. 6 and 7 may form part of the vehicle described in FIG. 1.

The invention claimed is:

1. A method for heating a coolant of an electrical traction machine of a motor vehicle, the electrical machine comprising, in addition to the coolant:
    a stator comprising a polyphase winding, the stator being in heat exchange with the coolant,
    a rotor, and
    an inverter/rectifier supplying power to the polyphase winding, the inverter/rectifier comprising a plurality of switching cells controlled by a control device, the method comprising controlling, using the control device, the switching cells so as to short-circuit the polyphase winding in predetermined conditions for heating the coolant.

2. The heating method according to claim 1, wherein the coolant also flows in a heating circuit of the motor vehicle.

3. The heating method according to claim 1, wherein the coolant also flows in a speed reducer of the motor vehicle.

4. The heating method according claim 1, wherein the polyphase winding is short-circuited when the coolant is below a threshold temperature when the coolant is oil.

5. A heating system for a motor vehicle comprising an electrical traction machine, the electrical machine comprising:
    a coolant,
    a stator comprising a polyphase winding, the stator being in heat exchange with the coolant,
    a rotor,
    an inverter/rectifier supplying power to the polyphase winding, the inverter/rectifier comprising a plurality of switching cells controlled by a control device, and
    a heating circuit for a motor vehicle interior,
    the coolant of the electrical machine also flowing in the heating circuit of the vehicle interior, or the coolant being in heat exchange with the heating circuit,
    wherein the coolant is heated according to the heating method of claim 1.

6. The heating system according to claim 5, wherein the heating system comprises, in addition to the heating circuit, an external cooling circuit, the heating circuit being branched from the external cooling circuit.

7. The heating system according to claim 6, wherein the external cooling circuit comprises a cooling radiator, and the heating circuit comprises a heating radiator.

8. The heating system according to claim 7, wherein the heating system comprises a valve placed between the electrical machine and the heating circuit.

9. A motor vehicle comprising a heating system according to claim 5.

10. The heating method according to claim 2, wherein the coolant also flows in a speed reducer of the motor vehicle.

11. The heating method according claim 2, wherein the polyphase winding is short-circuited when the coolant is below a threshold temperature when the coolant is oil.

12. A heating system for a motor vehicle comprising an electrical traction machine, the electrical machine comprising:
    a coolant,
    a stator comprising a polyphase winding, the stator being in heat exchange with the coolant,
    a rotor,
    an inverter/rectifier supplying power to the polyphase winding, the inverter/rectifier comprising a plurality of switching cells controlled by a control device, and
    a heating circuit for a motor vehicle interior,
    the coolant of the electrical machine also flowing in the heating circuit of the vehicle interior, or the coolant being in heat exchange with the heating circuit,
    wherein the coolant is heated according to the heating method of claim 2.

13. A motor vehicle comprising a heating system according to claim 6.

14. The heating method according claim 3, wherein the polyphase winding is short-circuited when the coolant is below a threshold temperature when the coolant is oil.

15. A heating system for a motor vehicle comprising an electrical traction machine, the electrical machine comprising:

a coolant, a stator comprising a polyphase winding, the stator being in heat exchange with the coolant, a rotor, an inverter/rectifier supplying power to the polyphase winding, the inverter/rectifier comprising a plurality of switching cells controlled by a control device, and a heating circuit for a motor vehicle interior, the coolant of the electrical machine also flowing in the heating circuit of the vehicle interior, or the coolant being in heat exchange with the heating circuit, wherein the coolant is heated according to the heating method of claim 3.

16. A motor vehicle comprising a heating system according to claim 7.

17. A heating system for a motor vehicle comprising an electrical traction machine, the electrical machine comprising:

a coolant, a stator comprising a polyphase winding, the stator being in heat exchange with the coolant, a rotor, an inverter/rectifier supplying power to the polyphase winding, the inverter/rectifier comprising a plurality of switching cells controlled by a control device, and a heating circuit for a motor vehicle interior, the coolant of the electrical machine also flowing in the heating circuit of the vehicle interior, or the coolant being in heat exchange with the heating circuit, wherein the coolant is heated according to the heating method of claim 4.

18. A motor vehicle comprising a heating system according to claim 8.

* * * * *